(12) United States Patent
Sturman

(10) Patent No.: US 8,694,230 B2
(45) Date of Patent: Apr. 8, 2014

(54) FUEL SYSTEMS AND METHODS FOR COLD ENVIRONMENTS

(75) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 1002 days.

(21) Appl. No.: 12/777,999

(22) Filed: May 11, 2010

(65) Prior Publication Data

US 2010/0299052 A1 Nov. 25, 2010

Related U.S. Application Data

(60) Provisional application No. 61/179,633, filed on May 19, 2009.

(51) Int. Cl.
*F02D 41/06* (2006.01)
(52) U.S. Cl.
USPC .......................................... 701/113; 123/549
(58) Field of Classification Search
USPC ............ 701/103, 104, 113; 123/179.3, 179.8, 123/179.16, 179.17, 446, 447, 456, 481, 123/495, 497, 498, 549, 527, 557, 575–578, 123/1 A, 27 A, 27 GE; 417/417, 490, 501
See application file for complete search history.

(56) References Cited

U.S. PATENT DOCUMENTS

| | | | | |
|---|---|---|---|---|
| 2,988,079 A | * | 6/1961 | Voigt | 123/179.3 |
| 4,543,914 A | * | 10/1985 | Harris | 123/41.31 |
| 4,934,907 A | | 6/1990 | Kroner | |
| 4,955,345 A | * | 9/1990 | Brown et al. | 123/381 |
| 5,159,915 A | * | 11/1992 | Saito et al. | 123/557 |
| 5,497,753 A | * | 3/1996 | Kopera | 123/494 |
| 5,503,133 A | * | 4/1996 | Trigger | 123/637 |
| 5,711,283 A | * | 1/1998 | Trigger | 123/637 |
| 5,787,863 A | * | 8/1998 | Henig et al. | 123/447 |

(Continued)

FOREIGN PATENT DOCUMENTS

| DE | 3729938 | 3/1989 |
|---|---|---|
| DE | 102008039079 | 1/2009 |

(Continued)

OTHER PUBLICATIONS

"International Search Report and Written Opinion of the International Searching Authority Dated Aug. 19, 2010", International Application No. PCT/US2010/034818.

*Primary Examiner* — John T. Kwon
*Assistant Examiner* — Johnny Hoang
(74) *Attorney, Agent, or Firm* — Blakely Sokoloff Taylor & Zafman LLP

(57) ABSTRACT

Fuel systems and methods for cold environments which includes a fuel pump having at least one solenoid coil in an unlaminated magnetic circuit, the fuel pump being disposed in a fuel tank, and a pump drive and pulsing system, the pump drive providing pump actuation current to the solenoid coil and the pulsing system providing short current pulses to the solenoid coil to cause Eddy current losses in the unlaminated magnetic circuit. The method includes, before cranking the engine for starting the engine, providing short, successive current pulses to the solenoid coil to cause eddy current heating in the unlaminated circuit and heating of the fuel in and around the fuel pump, turning on the fuel pump to commence fuel flow to the engine, and cranking the engine for starting after the fuel pump has been turned on. Various features are disclosed.

27 Claims, 4 Drawing Sheets

(56) References Cited

U.S. PATENT DOCUMENTS

| | | | |
|---|---|---|---|
| 5,992,387 A * | 11/1999 | Holtman et al. | 123/447 |
| 6,286,488 B1 * | 9/2001 | Wisinski | 123/481 |
| 6,694,950 B2 * | 2/2004 | Djordjevic | 123/446 |
| 6,807,943 B2 * | 10/2004 | VanWeelden et al. | 123/458 |
| 6,888,390 B2 * | 5/2005 | Graham et al. | 327/262 |
| 7,001,158 B2 | 2/2006 | Dunn | |
| 2002/0092492 A1 * | 7/2002 | Ohanian et al. | 123/179.21 |
| 2003/0116140 A1 * | 6/2003 | Forck et al. | 123/506 |
| 2004/0146417 A1 | 7/2004 | Dunn | |
| 2006/0027216 A1 * | 2/2006 | Hayashi et al. | 123/527 |
| 2010/0199953 A1 * | 8/2010 | Tsunooka | 123/491 |

FOREIGN PATENT DOCUMENTS

| | | |
|---|---|---|
| EP | 0116419 | 8/1984 |
| EP | 1336751 | 8/2003 |
| GB | 2436855 | 10/2007 |
| WO | WO-2005/104619 | 11/2005 |
| WO | WO-2007/126979 | 11/2007 |
| WO | WO-2008/102194 | 8/2008 |

* cited by examiner

FUEL SYSTEMS AND METHODS FOR COLD ENVIRONMENTS

CROSS-REFERENCE TO RELATED APPLICATION

This application claims the benefit of U.S. Provisional Patent Application No. 61/179,633 filed May 19, 2009.

BACKGROUND OF THE INVENTION

1. Field of the Invention

The present invention relates to fuel systems for internal combustion engines.

2. Prior Art

The terms freezing and melting are used herein in a general sense, and not necessarily in a strict technical sense. By way of example, oils tend to not have a clear freezing temperature, but rather steadily increase in viscosity with decreasing temperature, loosing their ability to flow or be poured to an increasing extent with decreasing temperatures. They also generally do not undergo a change of phase, so do not have a latent heat of fusion associated therewith that must be overcome to melt. Still, they do freeze in the sense of becoming substantially motionless when subjected to conditions where a liquid would flow or pour.

Internal combustion engines have been designed and constructed to run on various fuels. A typical passenger car engine runs on gasoline, which has a freezing point much lower than normally encountered, even in cold climates. Consequently, other engine starting problems such as oil viscosity, battery cranking power, etc, are encountered well before gasoline freezes, or at least becoming too viscous to flow to the carburetor or fuel injectors. Diesel fuel however, is another story, as it can become a problem for somewhat rarely encountered cold weather. Alternate fuels such as biodiesel fuels are particularly troublesome, as such fuel will exhibit very high viscosity, or at least not freely flow at winter temperatures often encountered in the more northern parts of the 48 states. Consequently if these fuels are to find common or somewhat common use, a solution must be found to this problem.

The typical cold weather problem encountered with diesel and biodiesel fuels is not the inability to pump the fuels, or to inject the same into the combustion chamber, as one can design a fuel pump to provide the required pumping force (pressure), and can use electrical heaters on the fuel line for starting and exhaust heat fuel heaters for continually heating the fuel as required, once the engine is started. However, the problem is in getting the cold fuel into the pump inlet. Typically in such engines, the fuel pump may pump that which is in the pump, but shortly after the engine starts, the fuel flow stops because of no fuel is running into the pump inlet, and the pump runs dry.

DETAILED DESCRIPTION OF THE PREFERRED EMBODIMENTS

In U.S. Pat. No. 7,001,158 entitled "Digital Fluid Pump", the disclosure of which is hereby incorporated by reference, a reciprocating double solenoid actuator fluid pump is disclosed. The purpose of the present invention is to use a pump of this general type both as a fuel pump in a fuel tank, and as a heating element or device to heat surrounding fuel to provide free flow of fuel into the pump inlet under cold engine operating conditions.

Figure 1:
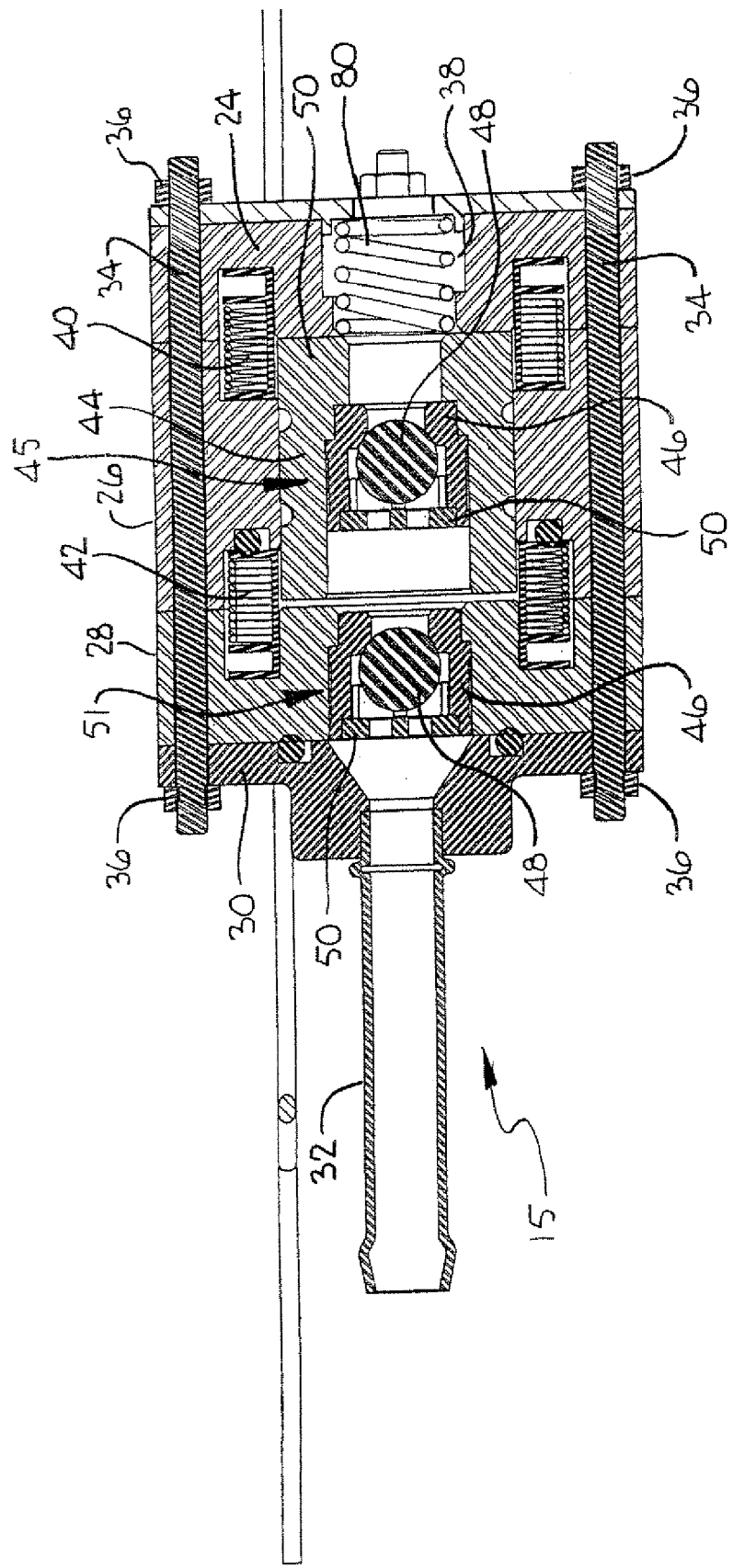
FIG. 1 is a reproduction of FIG. 7 of U.S. Pat. No. 7,001,158.

FIG. 1 is a reproduction of FIG. 7 of the '158 patent. In this Figure, the numerals identify the following parts of the fluid pump:

15 fluid pump
24 first end cap
26 pump body
28 second end cap
32 delivery tube
34 threaded tie rod
36 nuts
38 fluid supply inlet
40 first actuator coil
42 second actuator coil
44 piston
45 first one-way ball valve/ball valve
48 ball
46 ball valve seat
50 ball valve retainer
51 second one-way ball valve
80 preloaded mechanical spring Note that the magnetic members making up the magnetic circuits in the pump are solid (nonlaminated) magnetic members, with no permanent magnets present. The magnetic members in a magnetic circuit are frequently made of laminated magnetic material oriented with the magnetic field in the device being in the plane of the laminations so that Eddy current losses are reduced or minimized. Solid or nonlaminated as used herein is used in the sense of not being laminated to reduce Eddy current losses, but does not exclude multi-piece assemblies used for mechanical design or fabrication convenience. The spring 80 is optional, and spring returns on the ball valves may be used if desired. The pump may be operated in a number of different ways. By way of example, the pump may be free running, with a current pulse applied to coil 42 for a pumping stroke of piston 44 and then closely followed by a current pulse to coil 40 for return of the piston in readiness for the next pumping stroke, which can follow automatically. While the piston 44 is in essence a positive displacement piston, the pump itself is not, as the pumping stroke will be reduced automatically, even to substantially zero if necessary, when the fuel in the pump outlet reaches the maximum pressure that the pump can provide. Alternatively, a pressure sensor may be used in the fuel line to regulate the pressure delivered by the pump by controlling the repetition rate of the pumping and return strokes of the piston 44.

Figure 2:
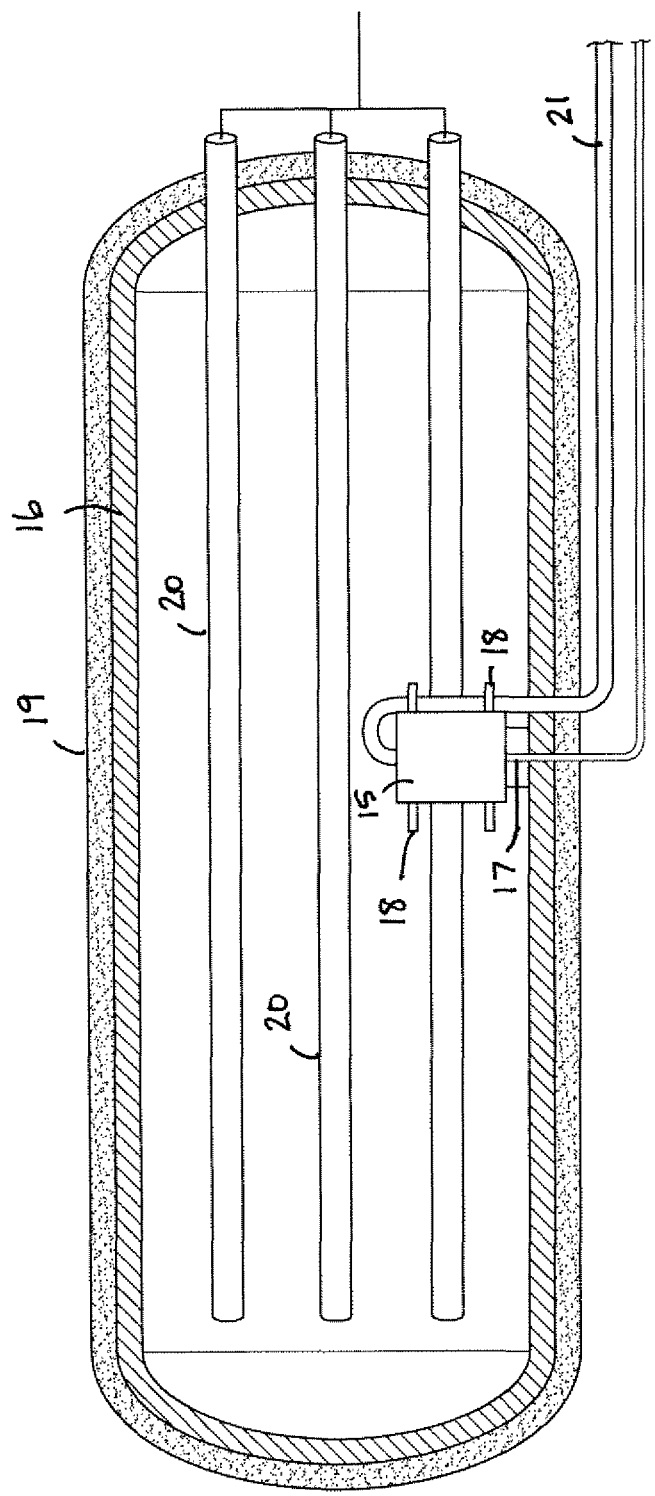
FIG. 2 is a schematic illustration of a fuel pump of the general type of the '158 patent in a fuel tank.

FIG. 2 is a schematic illustration of a fuel pump of the general type of the '158 patent in a fuel tank. The pump 15 in this embodiment is located within the fuel tank 16 with its axis vertically oriented, and with the fuel inlet end of the pump 15 being positioned adjacent the bottom of the fuel tank 16. As shown in the Figure, this embodiment is provided with optional heat conductive fins 18 on or attached to the pump body to dissipate the heat generated by the pump, first melting the fuel within and immediately adjacent the pump, and thereafter melting significant amounts of fuel in the general vicinity of the pump. The electronic control for the pump is provided through line 17, with the pump output being provided through fuel line 21.

Providing high and sustained DC currents to the actuator coils 40 and 42 of the fuel pump will heat the actuator coils, but since the actuator coils are electrically insulated from the surrounding metal of the magnetic circuits of the solenoid actuators, and electrical insulation normally is also a good thermal insulation, the actuator coils will heat up quickly, even to the point of burn out, but the entire valve will experience very little heating. However, if the actuator coils 40 and 42 are pulsed with a close succession of high frequency pulses, the resulting AC magnetic fields will result in large Eddy current loses in the magnetic circuits surrounding the actuator coils. If this is done before pumping is necessary, the current pulses may go above the pump actuating current levels, if desired, as the pump condition (piston position and movement) doesn't matter. However even after pumping is started, the current pulses may continue at a peak level below which the pump will be actuated, the current pulses being preempted by pump actuation pulses from the engine control system. Alternatively, even after pumping is started, the pulses between pump actuations may continue at a peak level above which the pump will be actuated, the current pulses again being preempted by pump actuation pulses from the engine control system. This is satisfactory if both coils are simultaneously pulsed, as then the greatest magnetic attraction of the piston will be to keep the piston in whatever position it is in after the last actuation.

Figure 3:
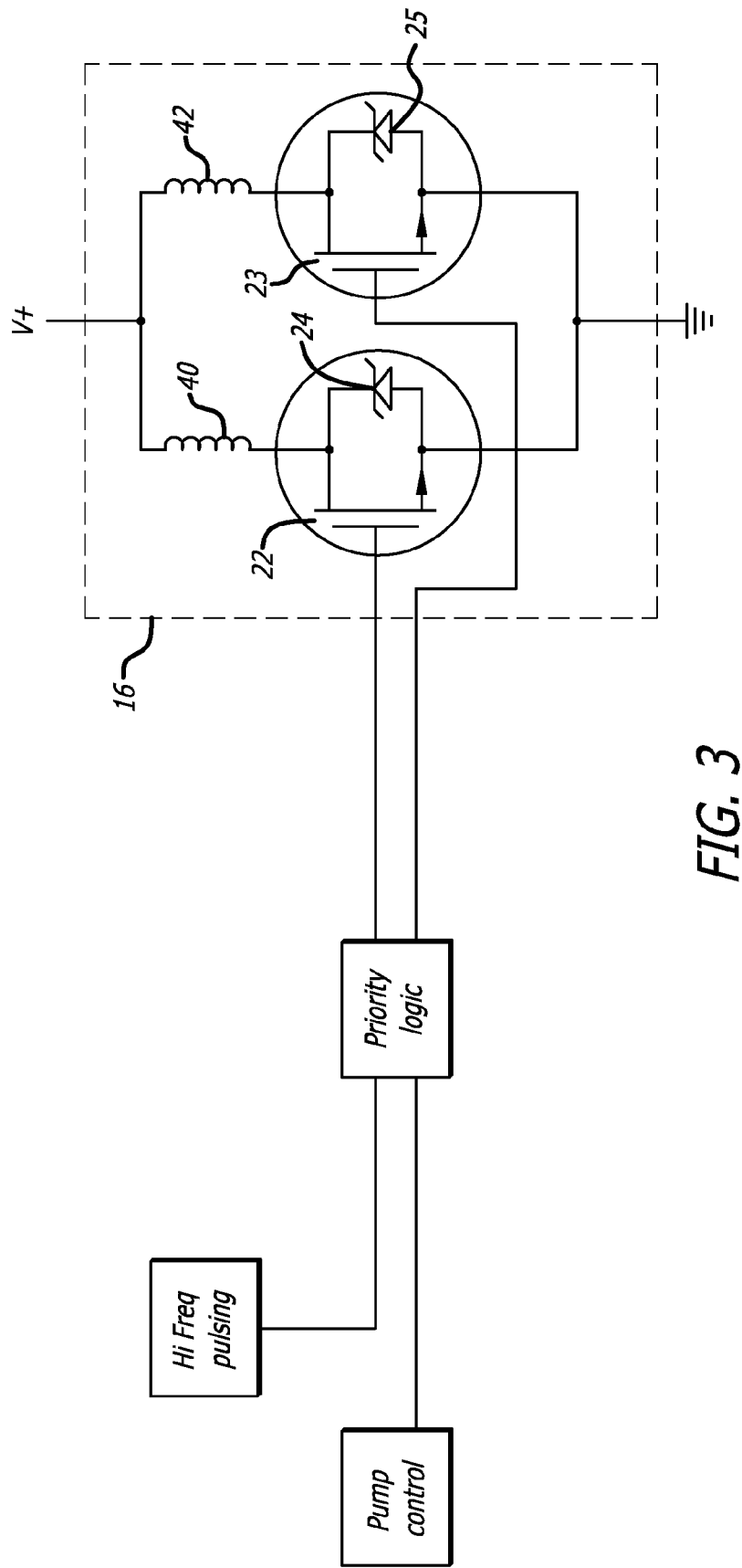
FIG. 3 is a diagram of a fuel pump in a fuel tank with associated control system.

Preferably, the current pulses for heating the pump body are each provided by coupling the full pump actuation voltage to the actuator coils 40 and 42 through power switches 22 and 23, as schematically illustrated in FIG. 3, and preferably simultaneously. This causes the current in the coils to increase at a rate dependent on the voltage applied and the inductance of the coils. Then the applied voltage is terminated, and the back EMF is absorbed by the power supply through diodes 24 and 25 coupled in parallel across the power switches. The power switches and diodes may themselves be heat sinked to the pump body within the fuel tank 16 if desired, so that any heat generated by the power switches and diodes may also add to the fuel warming. The pulsing of the two coils may be by current pulses of opposite polarities to maximize the participation of the pump body in the Eddy current losses, though pulsing of the two coils with current pulses of the same polarity may better concentrate the pump body heating toward the pump body outer surface for more useful heating of the pump body. The heating pulses (Hi Freq pulsing) may be interrupted by the pump control for pumping purposes, with the interrupt being handled by the priority logic.

Note that even if the current level of each pulse is limited to below that which will actuate the pump, the heating of the pump body can be as great, or even greater than if the current were allowed to go higher. In particular, heating of the pump coils 40 and 42 is proportional to the square of the RMS current used, so increases as the peak current level used increases. This increases the undesired direct heating of the coils. However, the Eddy currents generated are proportional to the rate of change of the magnetic field, so heating of the magnetic members making up the magnetic circuit is proportional to the square of the rate of change of the magnetic field, which in fact is greatest on first application of the heating current pulses, and will actually decrease to zero if the coil current is allowed to reach equilibrium. Further, when the current pulse is terminated, the magnetic field collapses at a rate determined by the power supply voltage minus the relatively small forward conduction voltage drop in the diodes. Thus the Eddy current heating of the magnetic members for short pulses can be even higher than for longer pulses, provided that the pulses follow each other without significant dwell at zero current between pulses. In that regard, it is preferable to let the currents reach zero before initiating the next current pulse to provide a known current pulse starting point, as otherwise the current could progressively increase, providing a reduced AC magnetic field for Eddy current heating and a higher RMS current in the actuator coil for the undesired concentrated heating of the actuator coil.

Figure 4:
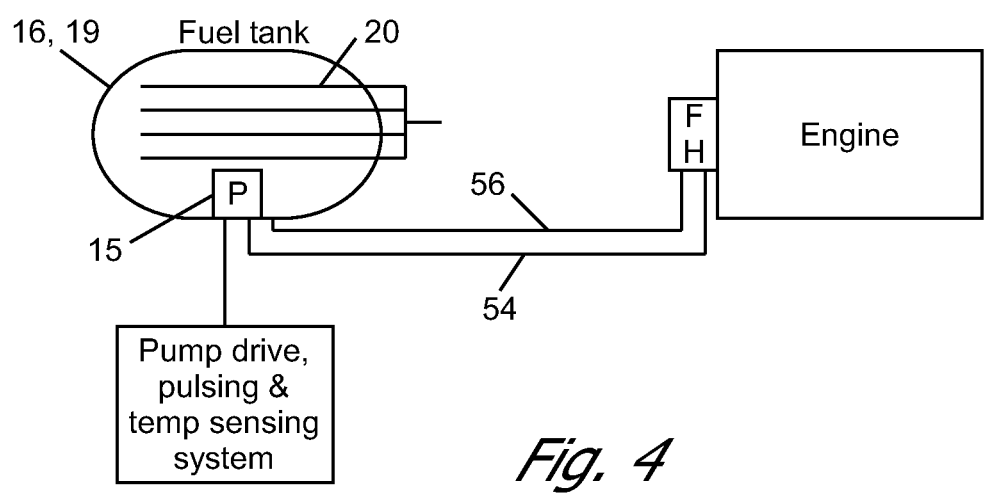
FIG. 4 is a block diagram of an exemplary fuel system.

In a typical application, the fuel pump may pulsed for heating the fuel in and around the pump, and then pumping started before engine cranking begins to purge the fuel system of the cold, very viscous fuel, typically in part heated by the pump itself as described herein, and typically further heated by electric heaters before entering the fuel injectors of the engine, with fuel initially being returned to the fuel tank before engine cranking begins. A system for accomplishing this is shown in schematic form in FIG. 4. In that Figure, the pump P (15) is shown in the insulated fuel tank 16,19 also having heaters 20 therein. The pump is powered by a Pump drive, pulsing & temp sensing system, with one fuel line 54 from the fuel tank 16,19 to the Engine through a fuel heater FH, and a second fuel line 56 from the fuel heater FH back to the fuel tank 16,19. This allows purging cold fuel from the fuel line 54 from the fuel tank to the engine before engine starting, and also allows excess fuel pump 15 capacity to be heated and flow back to the fuel tank 16,19 to help heat the remaining fuel in the fuel tank.

The present invention may be used alone, or together with other heaters such as conventional electric heaters 20 (FIGS. 2 and 4), or warm air from engine heat, in and/or around the fuel tank. In that regard, with fins, the present invention will quickly allow the fuel around the pump intake to easily flow, and soon allow a substantial quantity of fuel around the fuel pump to flow, at least as quickly as the pump intake needs fuel. The space occupied by the fuel that the pump does pump, and the vacuum that the removal of fuel by the pump causes, can cause the remaining fuel in the tank to slump, bringing more fuel into contact with the heated pump and its fins, etc. To aid in this process, the pump may be purposely selected to be somewhat oversize for the required maximum pumping rate for the engine, and in cold conditions, may continuously pump at its maximum rate, with the excess fuel being heated by the engine and then returned to the fuel tank to aid in melting the remaining fuel after the engine starts. One or more fuel temperature sensors may be used to terminate (or prevent) fuel heating when heating is no longer required, or simply not required in warmer weather. Also the fuel tank and/or fuel lines may be insulated by a layer of insulation 19 may be placed on the fuel tank to aid in the melting of the bulk of the fuel left in the tank once the engine starts. However for starting purposes, the present invention is far superior to attempting to entirely rely on electric heaters before and after starting and initial running of the engine. Prior to a cold start, electrical power is at a premium, and must be conserved to the maximum extent possible for engine cranking. Also while a fuel pump could be wrapped in an electric heater, still the heat would need time to soak into the pump and to melt the fuel therein and around the pump inlet. The advantage of the present invention is that the heat is actually generated within the pump parts where the heat is desired, so no time is needed for heat transfer from a heater to the pump, and the heating time required and the electrical energy consumed to achieve the desired results are both minimized.

As pointed out before, it is preferred to allow each heating current pulse to decay to zero before the next pulse. However, it is also desired to have the heating pulses follow in rapid succession. Consequently, it may be desirable to periodically check the temperature of coils 40 and 42 to be sure they are not overheating for some reason. This can easily be done by periodically interrupting the heating pulses to provide a small current through the coils during which the coil voltage is measured. The pulse can be very short, and generally may be interposed between pumping pulses without interfering with the pumping.

Electric heaters have an advantage in that they are relatively inexpensive. However they are based on an electrical conductor that is electrically insulated and thus thermally insulated from that which they are intended to heat. As packaged, they typically also have a rather small surface area, so normally rely on a rather large temperature differential to transmit much heat to the surrounding volume. When used in a fuel tank to melt fuel, a large temperature differential is not very attractive, and if melted fuel drains away from the heater and is not replaced by additional fuel because of it being effectively frozen, then there is a chance that the heater itself will over heat, a dangerous situation in a fuel tank. As an alternative or in addition to the use of conventional electric heaters, other types of heating could be use to melt the bulk of fuel in the fuel tank. By way of example, the phenomena used to heat the fuel pump could be used. A magnetic circuit of an unlaminated steel could be heated by pulsing a coil in the magnetic circuit to effectively provide a heater of greater area than that provided by conventional electric heaters. As a further alternative, the fuel pump itself may be a single solenoid coil, spring return type. In such case, the spring return may be either the pumping stroke or the refill stroke, as desired. In this case, the current pulses may have a peek amplitude below that which will actuate the pump to prevent pump flutter or essentially a hang-up in the solenoid actuated position.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of starting an engine in cold weather, the cold weather causing high viscosity of fuel in a fuel tank, comprising:
   a) providing a fuel pump that has at least one solenoid coil in an unlaminated magnetic circuit;
   b) disposing the fuel pump in the fuel tank;
   c) before cranking the engine for starting the engine, providing short, successive actuation voltage pulses to the solenoid coil to cause eddy current heating in the unlaminated magnetic circuit, each actuation voltage pulse being applied to the solenoid coil for a sufficiently short time so that current in the solenoid coil does not exceed an actuation current;
   d) turning on the fuel pump to commence fuel flow to the engine;
   e) cranking the engine for starting after the fuel pump has been turned on.

2. The method of claim 1 further comprised of providing heaters distributed within or around the fuel tank, the heaters being on after the engine starts.

3. The method of claim 1 further comprised of providing electric heaters distributed within the fuel tank, the electric heaters being on after the engine starts.

4. The method of claim 1 wherein the fuel pump has a pumping capacity exceeding a fuel flow required by the engine, and wherein the excess fuel is heated by engine heat and then returned to the fuel tank after the engine is started.

5. The method of claim 4 wherein the engine heat is engine exhaust heat.

6. The method of claim 1 wherein between d) and e), fuel pumped to the engine by the fuel pump is returned to the fuel tank to purge at least some cold fuel in a fuel line to the engine.

7. The method of claim 6 wherein the fuel is returned to the fuel tank adjacent the fuel pump.

8. The method of claim 1 wherein the fuel pump is provided with external fins to aid in the heat transfer from the unlaminated magnetic circuit to fuel surrounding the fuel pump.

9. The method of claim 1 wherein the fuel pump has a pair of solenoid coils, each disposed to attract a pumping member in a respective direction.

10. The method of claim 1 further comprising periodically sensing the temperature of the solenoid coil.

11. The method of claim 1 wherein current in the solenoid coil resulting from each actuation voltage pulse is allowed to decay to zero current before the next actuation voltage pulse is initiated.

12. The method of claim 1 wherein the fuel pump has two solenoid coils, and wherein providing short, successive current pulses to the solenoid coil comprises providing short, successive current pulses to both solenoid coils simultaneously.

13. The method of claim 1 wherein the fuel is a biodiesel fuel.

14. A method of starting an engine in cold weather using a biodiesel fuel from a fuel tank comprising:
   a) providing a fuel pump that has at least one solenoid coil in an unlaminated magnetic circuit, and providing heaters distributed within or around the fuel tank;
   b) disposing the fuel pump in the fuel tank;
   c) before cranking the engine for starting the engine, providing short, successive actuation voltage pulses to the solenoid coil to cause eddy current heating in the unlaminated circuit, each actuation voltage pulse being applied to the solenoid coil for a sufficiently short time so that current in the solenoid coil does not exceed an actuation current, and current in the solenoid coil resulting from each actuation voltage pulse being allowed to decay to zero current before the next actuation voltage pulse is initiated;
   d) when the heating has reduced the viscosity of the fuel in and around the fuel pump, turning on the fuel pump to commence fuel flow to the engine;
   e) cranking the engine for starting after the fuel pump has been turned on;
   f) having the heaters on after the engine starts.

15. The method of claim 14 wherein the heaters include electric heaters.

16. The method of claim 14 wherein the fuel pump has a pumping capacity exceeding a fuel flow required by the engine, and wherein the excess fuel is heated by engine heat and then returned to the fuel tank after the engine is started.

17. The method of claim 16 wherein the engine heat is engine exhaust heat.

18. The method of claim 14 wherein between d) and e), fuel pumped to the engine by the fuel pump is returned to the fuel tank to purge at least some cold fuel in a fuel line to the engine.

19. The method of claim 18 wherein the fuel is returned to the fuel tank adjacent the fuel pump.

20. The method of claim 14 wherein the fuel pump is provided with external fins to aid in the heat transfer from the unlaminated magnetic circuit to fuel surrounding the fuel pump.

21. The method of claim 14 wherein the fuel pump has a pair of solenoid coils, each disposed to attract a pumping member in a respective direction.

22. The method of claim 21 further comprising periodically sensing the temperature of the solenoid coil.

23. The method of claim 14 wherein the fuel pump has two solenoid coils, and wherein providing short, successive current pulses to the solenoid coil comprises providing short, successive current pulses to both solenoid coils simultaneously.

24. A fuel system for use with biofuels comprising:
   a fuel pump having at least one solenoid coil in an unlaminated magnetic circuit, the fuel pump being disposed in a biofuel tank; and
   a pump drive and pulsing system, the pump drive providing pump actuation current to the solenoid coil and the pulsing system providing short current pulses to the solenoid coil to cause Eddy current losses in the unlaminated magnetic circuit each actuation voltage pulse being applied to the solenoid coil for a sufficiently short time so that current in the solenoid coil does not exceed an actuation current, current in the solenoid coil resulting from the actuation voltage pulse being allowed to decay to zero current before the next actuation voltage pulse is initiated.

25. The fuel system of claim 24 wherein the pump drive and pulsing system also comprises a solenoid coil temperature sensing system.

26. The fuel system of claim 24 wherein the fuel pump has at least one fin to conduct heat generated by the Eddy current losses to the fuel in the fuel tank.

27. The fuel system of claim 24 further comprising:
   an engine;
   a fuel line from the fuel tank to the engine; and
   a fuel line from the engine to the fuel tank;
   whereby fuel may be at least temporarily pumped from the fuel tank to the engine and back to the fuel tank to purge cold fuel from the fuel line.

* * * * *